(12) United States Patent  
Gadkaree et al.

(10) Patent No.: US 9,843,043 B2
(45) Date of Patent: Dec. 12, 2017

(54) LITHIUM ION BATTERIES INCLUDING STABILIZED LITHIUM COMPOSITE PARTICLES

(71) Applicant: Corning Incorporated, Corning, NY (US)

(72) Inventors: Kishor Purushottam Gadkaree, Painted Post, NY (US); Xiaorong Liu, Oneonta, NY (US)

(73) Assignee: Corning Incorporated, Corning, NY (US)

( * ) Notice: Subject to any disclaimer, the term of this patent is extended or adjusted under 35 U.S.C. 154(b) by 117 days.

(21) Appl. No.: 14/615,483

(22) Filed: Feb. 6, 2015

(65) Prior Publication Data

US 2015/0228978 A1    Aug. 13, 2015

Related U.S. Application Data

(60) Provisional application No. 61/938,395, filed on Feb. 11, 2014.

(51) Int. Cl.
*H01M 4/505* (2010.01)
*H01M 10/058* (2010.01)
(Continued)

(52) U.S. Cl.
CPC .............. *H01M 4/505* (2013.01); *B22F 1/02* (2013.01); *B22F 7/04* (2013.01); *H01M 2/16* (2013.01);
(Continued)

(58) Field of Classification Search
CPC ............ Y02E 60/122; H01M 10/0525; H01M 10/058; H01M 10/042; H01M 4/5825;
(Continued)

(56) References Cited

U.S. PATENT DOCUMENTS 6,025,094 A * 2/2000 Visco ...................... H01M 4/04
427/126.2
8,920,925 B2  12/2014 Gadkaree et al.
(Continued)

FOREIGN PATENT DOCUMENTS

WO      2011/153205     12/2011

OTHER PUBLICATIONS

Song et al.; "Surface Control of Lithium Powder by Use of a DET"; Journal of the Korean Physical Society, vol. 54, No. 3 (Mar. 2009); pp. 1136-1140.
(Continued)

*Primary Examiner* — Osei Amponsah
(74) *Attorney, Agent, or Firm* — John L. Haack

(57) ABSTRACT

A lithium ion battery having a cathode and an anode, the cathode includes a material having an olivine or spinel structure, the anode includes a coating of a composite lithium powder coated with a complex lithium salt, such as $LiPF_6$, $LiBF_4$, $LiClO_4$, $LiAsF_6$, $LiF_3SO_3$, and mixtures thereof. A separator is disposed between the anode and the cathode, and a non-aqueous electrolyte solution in contact with the cathode, the anode, and the separator. The anode can include a carbon material. A layer of a composite lithium powder coated with a complex lithium salt can be disposed between the anode and the separator.

12 Claims, 2 Drawing Sheets

(51) Int. Cl.

| | |
|---|---|
| *H01M 10/0568* | (2010.01) |
| *H01M 10/0525* | (2010.01) |
| *H01M 4/58* | (2010.01) |
| *H01M 4/583* | (2010.01) |
| *B22F 1/02* | (2006.01) |
| *H01M 4/133* | (2010.01) |
| *H01M 4/134* | (2010.01) |
| *H01M 4/136* | (2010.01) |
| *H01M 4/1393* | (2010.01) |
| *H01M 4/1395* | (2010.01) |
| *H01M 4/1397* | (2010.01) |
| *H01M 4/36* | (2006.01) |
| *H01M 4/38* | (2006.01) |
| *H01M 4/40* | (2006.01) |
| *B22F 7/04* | (2006.01) |
| *H01M 2/16* | (2006.01) |
| *H01M 4/13* | (2010.01) |
| *H01M 10/42* | (2006.01) |
| *H01M 4/587* | (2010.01) |
| *H01M 4/04* | (2006.01) |

(52) U.S. Cl.
CPC .......... *H01M 2/1686* (2013.01); *H01M 4/13* (2013.01); *H01M 4/133* (2013.01); *H01M 4/134* (2013.01); *H01M 4/136* (2013.01); *H01M 4/1393* (2013.01); *H01M 4/1395* (2013.01); *H01M 4/1397* (2013.01); *H01M 4/366* (2013.01); *H01M 4/382* (2013.01); *H01M 4/405* (2013.01); *H01M 4/5825* (2013.01); *H01M 10/058* (2013.01); *H01M 10/0525* (2013.01); *H01M 10/0568* (2013.01); *H01M 10/42* (2013.01); *H01M 4/0409* (2013.01); *H01M 4/0471* (2013.01); *H01M 4/587* (2013.01); *H01M 2220/20* (2013.01); *H01M 2220/30* (2013.01); *Y02E 60/122* (2013.01); *Y02P 70/54* (2015.11); *Y10T 29/49115* (2015.01)

(58) Field of Classification Search
CPC ...... H01M 4/133–4/134; H01M 4/136; H01M 4/1393; H01M 4/1395; H01M 4/1397; H01M 4/366; H01M 4/382; H01M 4/405; H01M 4/587; H01M 4/0409; H01M 4/0471; H01M 4/13
USPC .............................................. 429/199–231.95
See application file for complete search history.

(56) References Cited

U.S. PATENT DOCUMENTS

| | | | |
|---|---|---|---|
| 9,183,994 B2 | 11/2015 | Gadkaree et al. | |
| 2003/0036000 A1* | 2/2003 | Mori | H01M 4/13 429/231.95 |
| 2009/0011333 A1* | 1/2009 | Wakita | H01M 4/134 429/220 |
| 2009/0061321 A1 | 3/2009 | Yakovleva et al. | |
| 2010/0156353 A1* | 6/2010 | Iyer | H01M 4/0404 320/137 |
| 2010/0297502 A1* | 11/2010 | Zhu | H01M 4/134 429/231.8 |
| 2012/0328945 A1* | 12/2012 | Hirose | H01M 2/1673 429/219 |
| 2013/0171502 A1 | 7/2013 | Chen et al. | |
| 2014/0146440 A1 | 5/2014 | Gadkaree et al. | |

OTHER PUBLICATIONS

European Patent Office; International Search Report; dated May 8, 2015; pp. 1-5.

* cited by examiner

LITHIUM ION BATTERIES INCLUDING STABILIZED LITHIUM COMPOSITE PARTICLES

This application claims the benefit of priority under 35 U.S.C. §119 of U.S. Provisional Application Ser. No. 61/938,395, filed on Feb. 11, 2014, the content of which is relied upon and incorporated herein by reference in its entirety.

FIELD

The present disclosure relates to lithium ion batteries, and more specifically to lithium ion batteries comprising stabilized lithium composite particles, and in particular embodiments in conjunction with one or more electrodes comprised of an olivine or spinel structure.

TECHNICAL BACKGROUND

Lithium ion batteries are commonly used in consumer electronic devices, such as laptop and tablet computers, mobile phones, and digital cameras. Rechargeable lithium and lithium-ion batteries are also utilized in automobiles, such as electric vehicles and hybrid vehicles.

Therefore, a need exists for alternative batteries that are cost-effective, have a high energy density, or both.

SUMMARY

The present disclosure relates to lithium ion batteries, and more specifically to lithium ion batteries comprising stabilized lithium composite particles, and in particular embodiments in conjunction with one or more electrodes comprised of an olivine or spinel structure. Disclosed herein is a lithium ion battery comprising an anode, a cathode, a separator, and a composite lithium powder. The composite lithium powder can be disposed on the cathode, the anode, or the separator, or a combination thereof, for example as a coating. The composite lithium powder is comprised of lithium-metal-based powder particles, such as lithium metal powder or a lithium metal alloy powder, or a combination thereof, coated with a complex lithium salt. In some embodiments, the battery comprises a cathode and an anode having a coating; in some of these embodiments, the cathode is made of a material comprising an olivine or spinel structure; in some embodiments, the coating on the anode is a composite lithium powder.

In some embodiments disclosed herein, a battery comprises a cathode, an anode, a separator disposed between the anode and the cathode, and a non-aqueous electrolyte solution in contact with the cathode, the anode, and the separator, the cathode made of a material comprising an olivine or spinel structure; in some embodiments, the cathode preferably comprises a carbon material. In some embodiments, a layer of composite lithium powder is disposed between the anode and the separator.

In other embodiments, a method of manufacturing a battery is disclosed herein comprising positioning a separator between an anode a cathode, the cathode comprising a material comprising a spinel or olivine structure, and the anode comprising a carbon material. A coating comprising lithium powder coated with $LiPF_6$ may be disposed between the separator and the anode.

Additional features and advantages of various embodiments will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
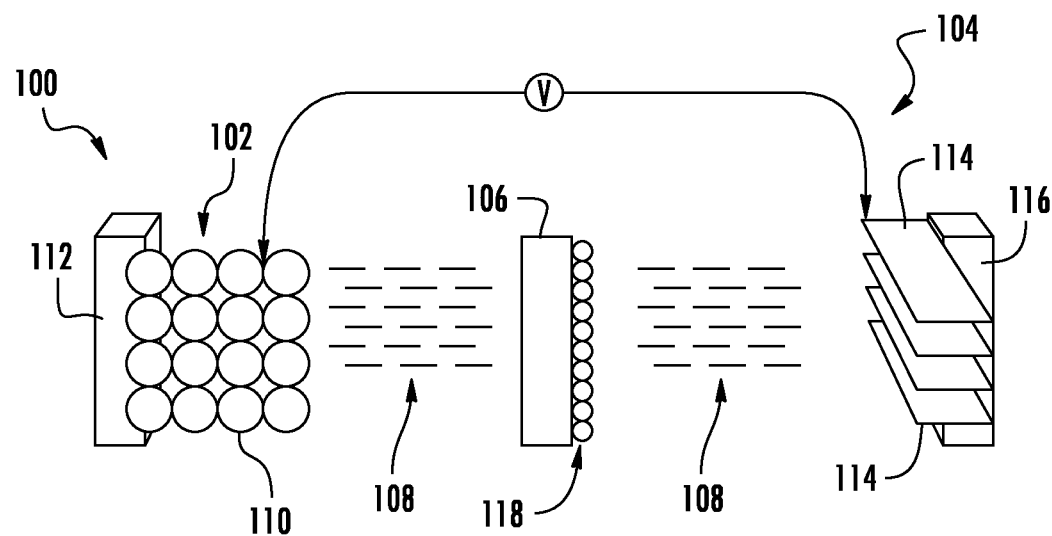
FIG. 1 schematically depicts a lithium ion battery according to one or more embodiments shown and described herein.

Reference will now be made in detail to various embodiments of lithium ion batteries, examples of which are illustrated in the accompanying drawings. Whenever possible, the same reference numerals will be used throughout the drawings to refer to the same or like parts. One embodiment of the lithium ion battery is shown in FIG. 1, and is designated generally throughout by the reference numeral 100. The lithium ion battery may generally comprise a cathode that comprises a material having an olivine or spinel structure and an anode having a coating of a composite lithium powder. Lithium ion batteries and the materials used to form the cathode and anode of the lithium ion batteries will be described in more detail herein with specific reference to the appended drawings.

Referring now to FIG. 1, in various embodiments, a lithium ion battery 100 comprises a cathode 102, an anode 104, and a separator 106 disposed between the cathode 102 and the anode 104. The diffusion of lithium ions between the cathode 102 and the anode 104 create a potential difference (i.e., a "voltage") across the battery 100. In some embodiments, an electrolyte solution 108 may be disposed between the cathode 102 and the anode 104 to assist in the diffusion of lithium ions between the cathode 102 and the anode 104. In the embodiments of the battery described herein, the cathode 102 and the anode 104 of the battery 100 are formed from materials which increase the energy density of the lithium ion battery relative to conventional lithium ion batteries.

In the embodiments described herein, the cathode 102 may comprise a material comprising an olivine or spinel structure 110. For example, the cathode 102 may comprise $LiMn_2O_4$ or $LiFePO_4$. In some embodiments, the cathode 102 is formed from a material comprising an olivine or spinel structure 110 coated onto a substrate 112 formed from a conductive material, such as a metal foil, such as aluminum foil, copper foil or the like.

In one embodiment, the cathode 102 is formed by coating a slurry containing a material having an olivine or spinel structure 110 onto aluminum foil with carbon ink to form the cathode 102. The coated foil is then dried to drive off the liquid from the slurry leaving behind a coating of carbon and the material having an olivine or spinel structure 110 on the foil.

Still referring to FIG. 1, the anode 104 may comprise a carbon-based material. For example, the anode 104 may comprise graphite or a hard carbon material 114. Examples of hard carbon include various industrially available cokes such as needle coke, petroleum coke, or carbon derived from carbonized organic or synthetic raw materials. The carbon-based material 114 may be coated onto a substrate 116 formed from a conductive material, such as aluminum foil, copper foil or the like. For example, in some embodiments, a slurry containing the carbon-based material 114 is coated onto aluminum foil with carbon ink. The coated foil is then dried to drive off the liquid from the slurry leaving behind a coating of the carbon-based material 114 on the foil.

In embodiments, the battery 100 may optionally comprise a separator 106 disposed between the cathode 102 and the anode 104. The separator 106 is utilized to keep the electrodes (i.e., the cathode 102 and the anode 104) apart thereby preventing an electrical short circuit while still allowing the transport of charge carriers (i.e., lithium ions) between the cathode 102 and the anode 104.

In the embodiments described herein, the separator 106 may be formed from a material suitable for holding the electrolyte solution 108 (e.g., the electrolyte solution 108 is prevented from leaving the separator 106 during charging or discharging of the battery). By selecting a material that is capable of preventing the electrolyte solution 108 from leaving the separator 106, it is less likely that the battery will become "dried out". For example, the separator 106 may be formed from a porous sheet or non-woven fabric of polyolefins such as polyethylene and polypropylene. However, it should be understood that other materials capable of holding the electrolyte solution 108 may also be used.

In various embodiments of the lithium ion battery 100 described herein, the battery 100 comprises a layer 118 of a composite lithium powder. The composite lithium powder may be a lithium metal powder coated with a complex lithium salt such as is shown and described in co-pending, commonly owned U.S. patent application Ser. No. 13/673, 019, filed Nov. 9, 2012, which is hereby incorporated by reference in its entirety. The composite lithium powder can be lithium metal powder or lithium metal alloy powder, or a combination thereof, comprising powder particles which are coated with a complex lithium salt. Layer 118 may be disposed between the anode 104 and the separator 106. For example, in one embodiment, the composite lithium powder may be coated directly on the anode 104. Alternatively, the layer 118 of the composite lithium powder may be coated on a face of the separator 106 proximate the anode. In yet another embodiment, the composite lithium powder may be coated on both the anode 104 and a face of the separator 106 proximate the anode 104.

In general, the composite lithium powder comprises a core and a coating that covers or even encapsulates the core. The core may be lithium metal powder or a lithium metal alloy powder, for example. The coating surrounds and encapsulates the core. The coating may be hermetic and prevent or substantially inhibit water or air, including oxygen, from contacting and reacting with the core. As such, the complex lithium salt coating stabilizes the lithium powder particles in the core with respect to ambient exposure.

Figure 2:
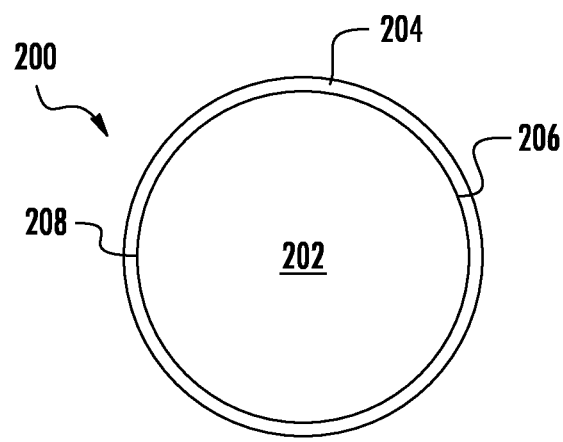
FIG. 2 schematically depicts a stabilized lithium composite particle according to one or more embodiments shown and described herein.

Referring now to FIG. 2 by way of example, a cross section of a stabilized lithium composite particle 200 is schematically depicted. The stabilized lithium composite particle 200 comprises a core 202 and a coating 204 that surrounds and encapsulates the core 202. The core 202 may comprise a unitary body defining an outer surface 206. The coating 204 is in direct physical contact with the outer surface 206 of the core 202 along an inner surface 208 of the coating 204. The coating may be inorganic and free of organic species.

In various embodiments, the core 202 is elemental lithium metal powder. However, in some embodiments, the core 202 may be a lithium alloy powder. Examples of such alloys include, by way of example and not limitation, lithium and one or more of Al, Si, Ge, Sn, Pb and Bi.

In embodiments, the coating 204 may be a lithium salt. In various embodiments, the lithium salt is a complex lithium salt, such as $LiPF_6$, $LiBF_4$, $LiClO_4$, $LiAsF_6$, or $LiF_3SO_3$, or mixtures thereof. As used herein, a complex lithium salt is any ionic compound comprising lithium and an additional metal, metalloid or non-metal atom that does not itself ionize and which is soluble in an organic solvent. For instance, $LiPF_6$ contains the metal atoms lithium and phosphorous, but the phosphorous does not ionize by itself. Instead, the phosphorous ionizes as the $PF_6^-$ ion. As another example, $LiBF_4$ contains lithium metal and the metalloid boron. Although lithium ionizes as $Li^+$, boron ionizes as the $BF_4^-$ ion rather than by itself. Similarly, $LiClO_4$ contains lithium metal and the non-metal atoms chlorine and oxygen. The non-metal atoms ionize as the perchlorate ion ($ClO_4^-$).

In various embodiments, the coating 204 may have a substantially uniform thickness or a variable thickness, depending, for example, on the method used to form the coating. For example, the lithium composite particles 200 may be formed by contacting the core 202 with a coating solution that comprises a coating material dissolved in a solvent. The coating material may comprise a lithium salt or complex lithium salt as described above. The solvent may be any solvent capable of dissolving the lithium salt. For example, THF, n-methyl pyrrolidone (NMP), methylene chloride, or combinations thereof may be utilized. The core 202 may be immersed in the solution or coated via spray coating or other means. After coating the core 202, the solvent is removed to form a layer of the coating 204. The solvent may be removed by evaporation, for example. The thickness of the resulting coating 204 may range from about 10 nm to about 100 microns, e.g., from about 0.01 to about 0.02 microns, from about 0.02 to about 0.05 microns, from about 0.05 to about 0.1 microns, from about 0.1 to about 0.2 microns, from about 0.2 to about 0.5 microns, from about 0.5 microns to about 1 micron, from about 1 to about 2 microns, from about 2 to about 5 microns, from about 5 to about 10 microns, from about 10 to about 20 microns, from about 20 to about 50 microns, or from about 50 to about 100 microns, and the thickness for a batch may be defined over a range of any two of the aforementioned values.

The thickness of the coating 204 may also be determined by controlling the concentration of the lithium salt in the coating solution. Generally, a higher salt content in the solution will yield a thicker coating 204. A concentration of the lithium salt in the coating solution may range from about 0.1 to about 4 molar, e.g., from about 0.1 to about 0.2 molar, from about 0.2 to about 0.5 molar, from about 0.5 to about 1 molar, from about 1 to about 2 molar, or from about 2 to about 4 molar. In various embodiments, the coating solution may be a saturated solution of lithium salt.

The lithium composite particle 200 may have an average particle size from about 5 microns to about 500 microns, e.g., from about 5 to about 10 microns, from about 10 to about 20 microns, from about 20 to about 50 microns, from about 50 to about 100 microns, from about 100 microns to about 200 microns, from about 200 to about 300 microns, from about 300 to about 400 microns, or from about 400 to about 500 microns. The particle size may be defined for a given batch of lithium composite particles 200 over a range of any two of the aforementioned values. In various embodiments, the lithium composite particle 200 may be substantially spherically shaped, and the term "particle size" is used to describe the diameter of the sphere. However, other shapes are contemplated, such as, but not limited to, asymmetric shapes or spheroids. In embodiments in which the lithium composite particle 200 has an oblong shape, the term "particle size" is used to describe the "length" of the particle.

The coating 204 may be from about 1 to about 50 wt. % of the total mass of the lithium composite particle 200. For instance, the coating 204 may be 1, 2, 5, 10, 20, 30, 40, or 50 wt. % of the total mass of the lithium composite particle 200. The thickness of the coating 204, along with the composition of the coating 204, may be chosen in order to provide an effective barrier to the diffusion of air, oxygen, and water.

Because the coating 204 encapsulates the lithium core 202 to substantially inhibit or prevent exposure and reaction of the lithium with ambient gases or liquids, the lithium composite particles 200 are substantially non-reactive or non-combustive if exposed to air, oxygen, or water. The lithium composite particles 200 may be sufficiently stable to be stored in air for at least one week, 2 weeks, 1 month, or even up to a year without substantial chemical degradation and/or combustion. In addition to having greater shelf-stability, the lithium composite particles 200 described herein may be incorporated the battery 100 directly in their stabilized form. This is in contrast to uncoated lithium metal that is conventionally stored under the cover of a viscous hydrocarbon, such as mineral oil. While the mineral oil encapsulant inhibits degradation of the lithium metal, it is generally incompatible with solid state devices, such as lithium ion batteries, and should be removed prior to incorporating the lithium into such a device.

Referring again to FIG. 1, in various embodiments, the battery 100 may comprise an electrolyte solution 108. In some embodiments, the electrolyte solution 108 is a non-aqueous electrolyte solution. The electrolyte solution 108 may comprise lithium salts or complex lithium salts such as $LiPF_6$, $LiBF_4$, $LiClO_4$, $LiAsF_6$, $LiF_3SO_3$, or mixtures thereof. In some embodiments, the electrolyte solution 108 may comprise the same lithium salt or complex lithium salt that is included in the coating 204 of the lithium composite particle 200 incorporated in the battery 100 between the anode 104 and the cathode 102. The electrolyte solution 108 may be added to wet the cathode 102, the anode 104, and the separator 106.

When the electrolyte solution 108 is added to the battery 100, the electrolyte solution 108 at least partially dissolves the coating 204 on the lithium composite particles 200 that are layered between the anode 104 and the separator 106. In various embodiments, a chemical composition of the electrolyte solution 108 before partially dissolving the coating is substantially similar to a chemical composition of the electrolyte solution 108 after dissolving the coating. For example, an electrolyte solution comprising $LiPF_6$ may be utilized in a battery 100 that also comprises lithium composite particles 200 that comprise $LiPF_6$ in the coating 204. Accordingly, as the electrolyte solution 108 dissolves the coating 204 of the lithium composite particles 200, the chemical composition (e.g., the components present in the solution) remains substantially the same, although the proportions of the components may be altered. Thus, the electrolyte solution 108 maintains its electrochemical properties, including its chemical composition, and is not polluted with the components that make up the lithium composite particles 200.

In various embodiments, the battery 100 may be assembled in a coin cell structure, such as a CR2032 stainless steel coin cell structure. The cathode 102 may be positioned in the bottom part of the case and the separator 106 may be positioned on top of the cathode 102. Then, a layer 118 of lithium composite powder may be positioned on the separator 106, and the anode 104 may be positioned on top of the layer 118 of lithium composite powder.

In some embodiments, the layer 118 of lithium composite powder may be coated onto at least one face of the anode 104. For example, the lithium composite powder may be applied as a coating to the face of the anode 104 that is proximate the separator 106, or the lithium composite powder may coat the entire anode 104. In other embodiments, the layer of lithium composite powder may be coated onto a face of the separator 106. For example, the lithium composite powder may be coated onto a face of the separator 106 proximate to the anode 104.

Then, electrodes and separator 106 may be wetted with the electrolyte solution 108. The electrolyte solution 108 can be, for example, 1 M $LiPF_6$ in EC/DMC/MP (20/20/60) with 5% FEC, although other electrolyte solutions are contemplated. Spacers and springs may be placed on the anode 104 and a top of the coin cell structure may be placed and sealed using a crimping machine.

EXAMPLES

Various embodiments will be further clarified by the following examples.

Example 1

A cathode comprising $LiMn_2O_4$ was made by coating a $LiMn_2O_4$ slurry on Al foil with carbon ink using a doctor blade. Carbon ink may enhance electrical contact as well as passivation of the foil, thus reducing resistance of the cell. The $LiMn_2O_4$ slurry was made by grinding 3.40 g $LiMn_2O_4$ powder, 0.20 g carbon black and 0.40 g PVDF binder for 20 minutes at a speed of 300 rpm, followed by adding 12.4 g NMP (N-methyl-2-pyrrolidone) to form a slurry using a mortar. The coated Al foil electrode sheet was dried in a vacuum oven at 120° C. overnight and then cut into electrode discs with a diameter of 14 mm.

An anode with AFH423 hard carbon was made by laminating a slurry containing 90% AFH423 hard carbon, 5% PVDF, and 5% super C45 on Al foil with carbon ink using a roller. The laminated Al foil electrode sheet was cut into discs with a diameter of about 14 mm. The resulting electrode discs were dried in a vacuum oven at 120° C. overnight.

The battery was assembled in a CR2032 stainless steel coin cell structure. The cathode was positioned in the bottom part of the case and a cellulose paper separator having a thickness of 25 microns was positioned on top of the cathode. Then, a layer of lithium composite powder (approximately 5.0 mg) was positioned on the separator, and the anode was positioned on top of the layer of lithium composite powder.

Then, the electrodes and separator were wetted with the electrolyte solution containing 1 M $LiPF_6$ in EC/DMC/MP (20/20/60) with 5% FEC. Spacers and springs were placed on the anode and the top of the coin cell structure was placed and sealed using a crimping machine. A comparative battery was also assembled utilizing the same process, although the layer of lithium composite powder was omitted.

Figure 3:
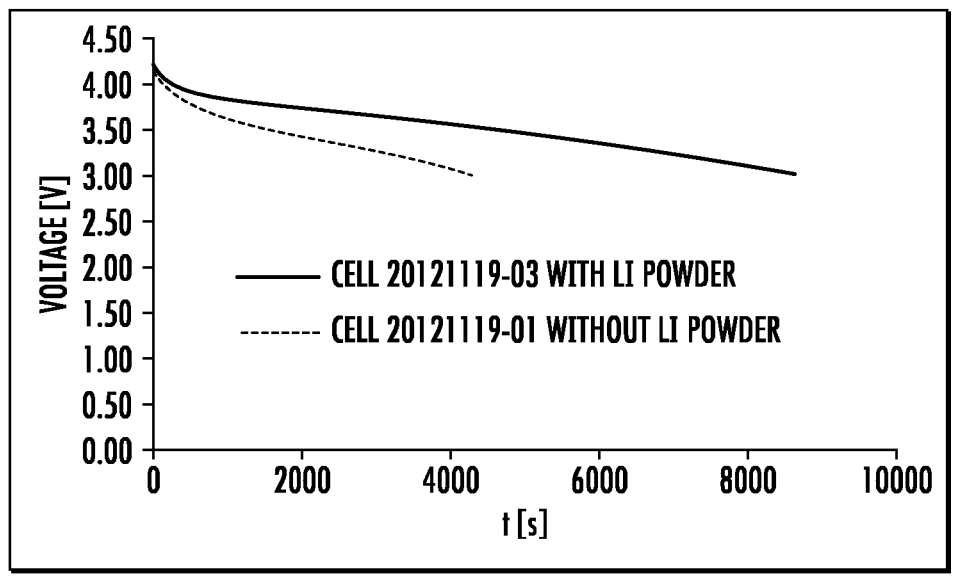
FIG. 3 graphically depicts the constant current discharge curves of batteries having a $LiMn_2O_4$ cathode with and without lithium composite powder between the anode and the separator according to one or more embodiments shown and described herein.

Electrochemical measurements were conducted using a potentiostat/galvostat available from Gamry Instruments with Framework 5 software. Energy densities of the batteries were calculated by integrating the constant current discharge curves. FIG. 3 illustrates constant current discharging curves of the batteries at 1 mA.

As shown in FIG. 3, the battery comprising the lithium composite powder had an increased discharging time, indicating that the battery comprising the lithium composite powder had an increased capacity compared to the battery without the lithium composite powder. The energy density for the battery without the lithium composite powder was approximately 38 Wh/L compared to the energy density for the battery with the lithium composite powder, which was approximately 77 Wh/L. The increase in energy density can be attributed to the presence of the lithium composite powder between the anode and the separator. Thus, the battery with the lithium composite powder had an energy density approximately double the energy density of the battery without the lithium composite powder.

Example 2

A cathode comprising $LiFePO_4$ was made by laminating a $LiFePO_4$ slurry on Al foil with carbon ink using a roller. The $LiFePO_4$ slurry was made by mixing 1.80 g $LiFePO_4$ powder, 0.10 g super C45 and 0.10 g PVDF binder in a miller for 20 minutes at a speed of 300 rpm. Then, 2.89 g NMP (N-methyl-2-pyrrolidone) was added to form a slurry. The slurry was heated for 20 min at 110° C. on a hot plate until it formed a paste. The laminated Al foil electrode sheet cut into discs with a diameter of 14 mm and the discs were dried in a vacuum oven at 120° C. overnight.

An anode with AFH423 hard carbon was made by laminating a slurry containing 90% AFH423 hard carbon, 5% PVDF, and 5% super C45 on Al foil with carbon ink using a roller. The laminated Al foil electrode sheet was cut into discs with a diameter of about 14 mm. The resulting electrode discs were dried in a vacuum oven at 120° C. overnight.

The battery was assembled in a CR2032 stainless steel coin cell structure. The cathode was positioned in the bottom part of the case and a cellulose paper separator having a thickness of 25 microns was positioned on top of the cathode. Then, a layer of lithium composite powder (approximately 5.0 mg) was positioned on the separator, and the anode was positioned on top of the layer of lithium composite powder.

Then, the electrodes and separator were wetted with the electrolyte solution containing 1 M $LiPF_6$ in EC/DMC/MP (20/20/60) with 5% FEC. Spacers and springs were placed on the anode and the top of the coin cell structure was placed and sealed using a crimping machine. A comparative battery was also assembled utilizing the same process, although the layer of lithium composite powder was omitted.

Figure 4:
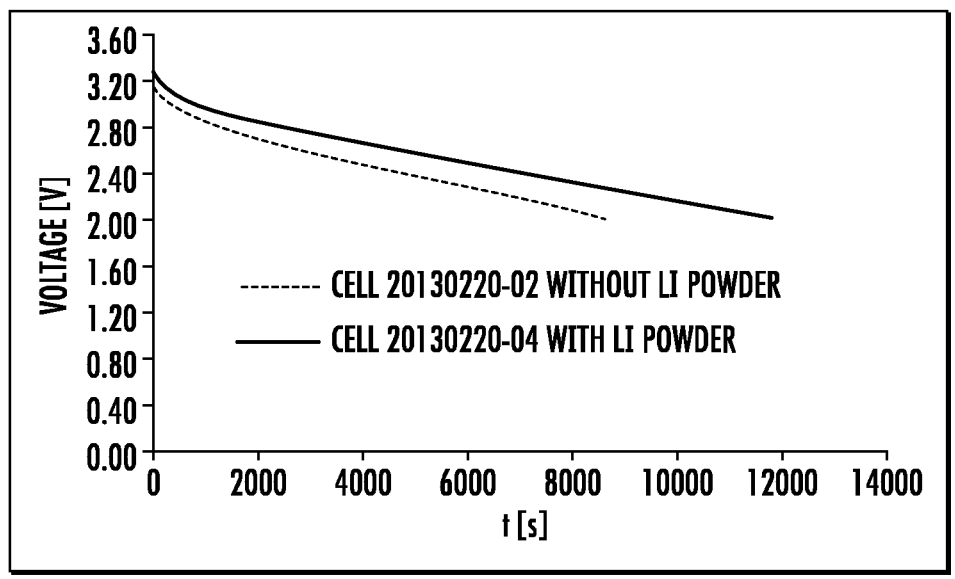
FIG. 4 graphically depicts the constant current discharge curves of batteries having a $LiFePO_4$ cathode with and without lithium composite powder between the anode and the separator according to one or more embodiments shown and described herein.

Electrochemical measurements were conducted using a potentiostat/galvostat available from Gamry Instruments with Framework 5 software. Energy densities of the batteries were calculated by integrating the constant current discharge curves. FIG. 4 illustrates constant current discharging curves of the batteries at 1 mA.

As shown in FIG. 4, the battery comprising the lithium composite powder had an increased discharging time, indicating that the battery comprising the lithium composite powder had an increased capacity compared to the battery without the lithium composite powder. The energy density for the battery without the lithium composite powder was approximately 74.6 Wh/L compared to the energy density for the battery with the lithium composite powder, which was approximately 101.7 Wh/L. Thus, the battery with the lithium composite powder had an energy density increase of approximately 36.4% over the energy density of the battery without the lithium composite powder.

Example 3

A cathode comprising $LiCoO_2$ was made according to known methods, such as those described hereinabove. Similarly, an anode with AFH423 hard carbon was made according to the methods described hereinabove.

The battery was assembled in a CR2032 stainless steel coin cell structure. The cathode was positioned in the bottom part of the case and a cellulose paper separator having a thickness of 25 microns was positioned on top of the cathode. Then, a layer of lithium composite powder (approximately 5.0 mg) was positioned on the separator, and the anode was positioned on top of the layer of lithium composite powder.

Then, the electrodes and separator were wetted with the electrolyte solution containing 1 M $LiPF_6$ in EC/DMC/MP (20/20/60) with 5% FEC. Spacers and springs were placed on the anode and the top of the coin cell structure was placed and sealed using a crimping machine. A comparative battery was also assembled utilizing the same process, although the layer of lithium composite powder was omitted.

Electrochemical measurements were conducted using a potentiostat/galvostat available from Gamry Instruments with Framework 5 software. Energy densities of the batteries were calculated by integrating the constant current discharge curves. The battery comprising the lithium composite powder did not show a statistically distinguishable improvement in energy density when compared to the energy density of the battery without the lithium composite powder. Thus, the lithium composite powder may not have an impact on the energy density of batteries in which the cathode comprises layered compounds, such as $LiCoO_2$, despite the improved energy density observed in batteries in which the cathode comprises compounds having an olivine or spinel structure.

It should now be understood that the batteries described herein have materials having olivine or spinel structures in the cathode and a layer of a lithium composite powder coated with a complex lithium salt between the separator and the anode. These materials and battery structure leads to an increased energy density for the battery. As such, the lithium-ion batteries described herein are well-suited for consumer device applications where extended battery life is highly desirable.

In a first aspect, the disclosure provides a battery having a cathode comprising a material comprising an olivine or spinel structure and an anode coated with a composite lithium powder.

In a second aspect, the disclosure provides a battery comprising a cathode comprising a material comprising an olivine or spinel structure, an anode comprising a carbon material, a separator disposed between the anode and the cathode, and a non-aqueous electrolyte solution in contact with the cathode, the anode, and the separator. A layer of a composite lithium powder may be disposed between the anode and the separator.

In a third aspect, the disclosure provides the battery of the first or second aspects, wherein the cathode comprises $LiMnO_4$.

In a fourth aspect, the disclosure provides the battery of the first or second aspects, wherein the cathode comprises $LiFePO_4$.

In a fifth aspect, the disclosure provides the battery of any of the first through fourth aspects, wherein the anode comprises a graphite or hard carbon material.

In a sixth aspect, the disclosure provides the battery of any of the first through fifth aspects further comprising a separator disposed between the anode and the cathode, wherein a layer of the composite lithium powder is disposed between the anode and the separator.

In a seventh aspect, the disclosure provides the battery of any of the first through sixth aspects, further comprising a non-aqueous electrolyte solution, the non-aqueous electrolyte solution comprising a complex lithium salt.

In an eighth aspect, the disclosure provides the battery of any of the first through seventh aspects, further comprising an electrolyte solution in contact with the cathode and the anode, wherein the electrolyte solution at least partially dissolves the coating such that a chemical composition of the electrolyte solution before partially dissolving the coating is substantially similar to a chemical composition of the electrolyte solution after dissolving the coating.

In a ninth aspect, the disclosure provides the battery of any of the first through eighth aspects, wherein the complex lithium salt is selected from the group consisting of $LiPF_6$, $LiBF_4$, $LiClO_4$, $LiAsF_6$, $LiF_3SO_3$, and combinations thereof.

In a tenth aspect, the disclosure provides the battery of any of the first through ninth aspects, wherein the carbon material of the anode is graphite carbon.

In an eleventh aspect, the disclosure provides the battery of any of the first through tenth aspects, wherein the non-aqueous electrolyte solution comprises a $LiPF_6$ salt.

In a twelfth aspect, the disclosure provides a method of manufacturing the battery of any of the first through eleventh aspects in which the method comprises positioning a separator between an anode comprising a carbon material and a cathode comprising a spinel or olivine structure, wherein a coating comprising lithium powder coated with $LiPF_6$ is disposed between the separator and the anode.

In a thirteenth aspect, the disclosure provides the method of the twelfth aspect, wherein the coating of a lithium powder coated with $LiPF_6$ is provided on the anode.

In a fourteenth aspect, the disclosure provides the methods of the twelfth or thirteenth aspects, wherein the coating of the lithium powder coated with LiPF6 is provided on a face of the separator proximate the anode.

In a fifteenth aspect, the disclosure provides the methods of one of the twelfth through fourteenth aspects, further comprising wetting the anode, the cathode, and the separator with a non-aqueous electrolyte solution comprising a $LiPF_6$ salt, wherein the non-aqueous electrolyte solution at least partially dissolves the $LiPF_6$ coating on the lithium powder such that a chemical composition of the non-aqueous electrolyte solution before dissolving the $LiPF_6$ coating is substantially similar to a chemical composition of the electrolyte solution after dissolving the $LiPF_6$ coating.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A lithium ion battery comprising:
    a cathode comprising a material comprising an olivine or spinel structure; and
    an anode comprising a graphite or hard carbon material and having a coating, the coating comprising a composite lithium powder comprising a lithium metal powder core coated with a complex lithium salt selected from the group consisting of $LiPF_6$, $LiBF_4$, $LiClO_4$, $LiAsF_6$, $LiF_3SO_3$, and mixtures thereof that surrounds and encapsulates the core.

2. The battery according to claim 1, wherein the material of the cathode comprises $LiMnO_4$.

3. The battery according to claim 1, wherein the material of the cathode comprises $LiFePO_4$.

4. The battery according to claim 1, further comprising:
    a separator disposed between the anode and the cathode, wherein a layer of the composite lithium powder is disposed between the anode and the separator.

5. The battery according to claim 1, further comprising:
    a non-aqueous electrolyte solution, the non-aqueous electrolyte solution comprising a complex lithium salt.

6. The battery according to claim 1, further comprising an electrolyte solution in contact with the cathode and the anode, wherein the electrolyte solution at least partially dissolves the coating such that a chemical composition of the electrolyte solution before partially dissolving the coating is substantially similar to a chemical composition of the electrolyte solution after dissolving the coating.

7. A battery comprising:
    a cathode comprising a material having an olivine or spinel structure;
    an anode comprising a carbon material;
    a separator disposed between the anode and the cathode, wherein a layer of a composite lithium powder comprising a lithium metal powder core coated with a complex lithium salt selected from the group consisting of $LiPF_6$, $LiBF_4$, $LiClO_4$, $LiAsF_6$, $LiF_3SO_3$, and mixtures thereof that surrounds and encapsulates the core is disposed between the anode and the separator; and
    a non-aqueous electrolyte solution in contact with the cathode, the anode, and the separator.

8. The battery according to claim 7, wherein the carbon material of the anode comprises graphite carbon.

9. The battery according to claim 8, wherein the material of the cathode comprises $LiMnO_4$.

10. The battery according to claim 9, wherein the non-aqueous electrolyte solution comprises a $LiPF_6$ salt.

11. The battery according to claim 8, wherein the material of the cathode comprises $LiFePO_4$.

12. The battery according to claim 11, wherein the non-aqueous electrolyte solution comprises a $LiPF_6$ salt.

* * * * *